(12) United States Patent
DeLuca et al.

(10) Patent No.: US 8,635,020 B2
(45) Date of Patent: Jan. 21, 2014

(54) GPS LOCATION AND FAVORITE PREDICTION BASED ON IN-VEHICLE META-DATA

(75) Inventors: Lisa Seacat DeLuca, San Francisco, CA (US); Clive Hannah, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 390 days.

(21) Appl. No.: 12/359,031

(22) Filed: Jan. 23, 2009

(65) Prior Publication Data

US 2010/0191466 A1 Jul. 29, 2010

(51) Int. Cl.
*G01C 21/00* (2006.01)

(52) U.S. Cl.
USPC ........... 701/431; 701/425; 701/433; 701/532; 701/533; 701/468; 701/469; 340/425.5; 340/539.13; 340/539.22; 340/955.1; 340/955.13; 340/995.19; 715/835; 715/853

(58) Field of Classification Search
USPC ......... 701/533, 532, 537, 425, 431, 433, 468, 701/469; 340/995.13, 995.19, 995.1, 340/539.22; 715/835, 853
See application file for complete search history.

(56) References Cited

U.S. PATENT DOCUMENTS

| 6,295,275 | B1 | 9/2001 | Croslin | |
|---|---|---|---|---|
| 6,829,532 | B2 | 12/2004 | Obradovich et al. | |
| 2005/0171686 | A1* | 8/2005 | Davis | 701/200 |
| 2007/0255493 | A1* | 11/2007 | Ayoub et al. | 701/211 |
| 2010/0131191 | A1* | 5/2010 | Ohki | 701/201 |
| 2012/0110511 | A1* | 5/2012 | Howard | 715/835 |

FOREIGN PATENT DOCUMENTS

| EP | 0699330 | 4/1998 |
|---|---|---|
| EP | 1816435 A1 | 8/2007 |

* cited by examiner

*Primary Examiner* — Yogesh C Garg
(74) *Attorney, Agent, or Firm* — Konrad Raynes Davda & Victor LLP; Janaki K. Davda (57) ABSTRACT

According to one embodiment of the present invention, a method for automatically entering favorite locations into a navigation system is provided. The method according to one embodiment includes receiving information regarding a location from an object within a vehicle using a navigation system. An identifier to the information and the information and identifier are stored in the navigation system. The user may retrieve the information from the navigation system using the identifier. The information from the objects may be received in various wireless formats, including RFID, Bluetooth and Wi-Fi.

25 Claims, 5 Drawing Sheets

GPS LOCATION AND FAVORITE PREDICTION BASED ON IN-VEHICLE META-DATA

BACKGROUND

The present invention relates to vehicle-based global positioning systems (GPS), and more specifically, to the input of GPS locations and GPS favorites based on in-vehicle meta-data gathering.

There is an increasing use of GPS-based navigation systems in vehicles. Such navigation systems receive signals from an array of satellites which are part of the GPS. Based on received signals, GPS-based navigation systems may identify a vehicle's location in terms of latitude and longitude. The navigation system may also detect the vehicle's speed and direction of travel. With geographic information stored in an on-board computer in the vehicle, the navigation system is capable of audio-visually communicating to a user instructions for reaching a given destination.

A driver of a vehicle equipped with a GPS-based navigation system may manually input the address of a desired destination, and the navigation system may suggest one or more routes to the destination based on the map data and user's present position. In addition to the manual input of destination information, GPS-based navigation systems may also offer features such as directions to popular points of interest using previously stored data. Also, a user may store a list of favorite destinations, which may, for example, consist of previously visited locations.

SUMMARY

According to one embodiment of the present invention, a method comprises: receiving information regarding a location from an object within a vehicle using a navigation system; assigning an identifier to the information; storing the information and the identifier in the navigation system; and retrieving the information from the navigation system using the identifier.

According to another embodiment of the present invention, a method comprises: transmitting a signal to a plurality of objects inside a vehicle using a GPS-based navigation system; receiving signals from a plurality of objects inside the vehicle in response to the transmitting; using the received signals to determine locations and names of the locations; and storing the locations and names.

According to a further embodiment of the present invention, a system comprises: a navigational system located in a vehicle; at least one object located in the vehicle; a receiver for receiving information from the objects by means of a wireless signal; a storage device for storing the received information; and a processor for receiving the information and generating directions to locations based on the information.

According to another embodiment of the present invention, a computer program product for controlling a navigational system comprises: a computer usable medium having computer usable program code embodied therewith, the computer usable program code comprising: computer usable program code configured to: receive information regarding a location from an object within a vehicle using a navigation system; assign an identifier to the information; store the information and the identifier in the navigation system; and retrieve the information from the navigation system using the identifier.

DETAILED DESCRIPTION

Embodiments of the invention provide a system, method and computer program product for automatically predicting GPS locations and favorites based on in-vehicle meta-data gathering from objects within the vehicle. The objects may include any object capable of transmitting information and may include rental car keys, hotel room keys, employee badges, smart itineraries, PDAs, cell phones, laptop computers, and other objects. In various embodiments of the invention, the metadata may be transmitted from the in-vehicle objects using one or more types of transmission systems, such as RFID tags, Bluetooth, Wi-Fi, and others.

In prior systems, users were required to manually enter information into GPS navigation systems to indicate favorite destinations. Particularly when travelling, it may be burdensome and time-consuming for a user to enter information regarding new locations, such hotels, workplaces, airports, places of interest, etc. With the present invention, this kind of information may be automatically entered and saved a favorites in the GPS-based navigation system.

Figure 1:
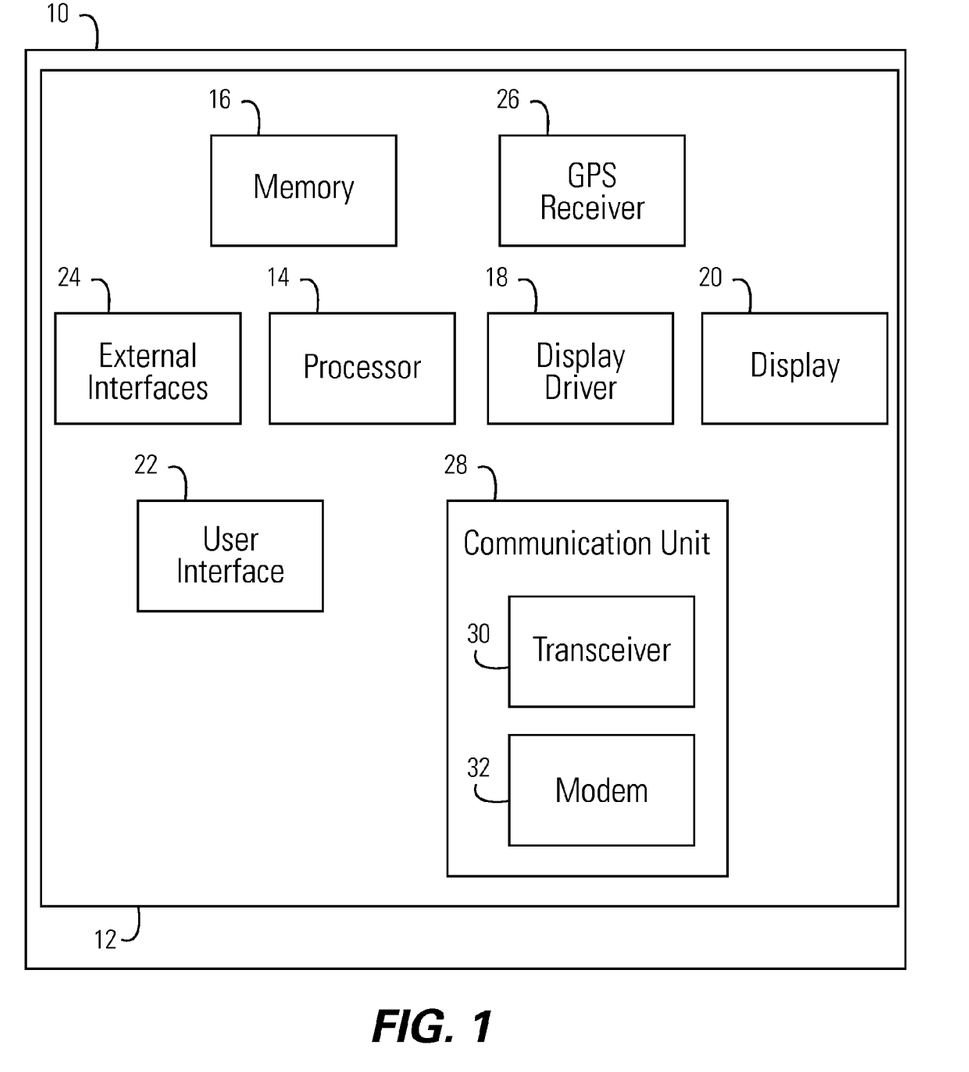
FIG. 1 shows a diagram of an in-vehicle GPS-based navigation system in accordance with an embodiment of the invention.

FIG. 1 illustrates a vehicle 10 having an on-board GPS-based navigation system 12 embodying the principles of the invention for predicting favorite destinations in accordance with an embodiment of the invention. Navigation system 12 includes processor 14, memory 16, display driver 18, display 20, user interface 22, external interfaces 24, GPS receiver 26, and communication unit 28.

Memory 16 is used to store software and data for processor 14 to carry out various operations of navigation system 12. In this instance, the stored software may include a navigator web browser for browsing information provided, e.g., by servers connected to the Internet. In particular, the navigator browser works compatibly with the standard hypertext transfer protocol (HTTP), hypertext markup language (HTML), virtual reality markup language (VRML), graphics interchange format (GIF), JAVA applets, etc.

Display 20 may include a conventional liquid crystal display (LCD). Through display driver 18, processor 14 controls the display of text and graphics on display 20 in a predetermined format. User interface 22 may comprise conventional audio circuitry including a microphone and speaker for the user to communicate with navigation system 12 via audio media. User interface 22 may also comprise an indicator device, e.g., a mouse, touchpad, roller ball, or a combination thereof, which may enable a user to move a cursor on display 20 and to point and click at a displayed option or an icon to select same. In addition, user interface 22 may incorporate well-known touch-screen circuitry (not shown). With this circuitry, the user can interact with processor 14 by using a finger or a stylus to touch the surface of display 20, which is tactile-sensitive. Processor 14 receives from the touch screen circuitry a signal identifying the location on display 20 where it has been touched. If such a location matches the predetermined location of one of displayed options or icons, processor 14 determines that the option or icon has been selected. Otherwise, a cursor is placed at the touched location on display 20, prompting for an input from the user.

The user input may be realized using a virtual keyboard shown on display 20 also provided by the touch-screen circuitry. In a well known manner, characters are input by touching the corresponding keys on the virtual keyboard. Alternatively, processor 14 may be programmed to recognize handwritten characters, and may receive through the touch-screen circuitry images of characters drawn by the user on display 20. Any recognized characters corresponding to the drawn images then become the user input. Still alternatively, through one of external interfaces 24, navigation system 12 can be connected to a keyboard device or a personal computer (PC) having a keyboard for user input.

In accordance with embodiments of the invention, navigation system 12 may receive metadata from objects in the vehicle 10, through communication unit 28. To that end, a transceiver 30 in communication unit 28 may include a plurality of means for transmitting and receiving information wirelessly to objects in the vehicle 10.

Figure 2:
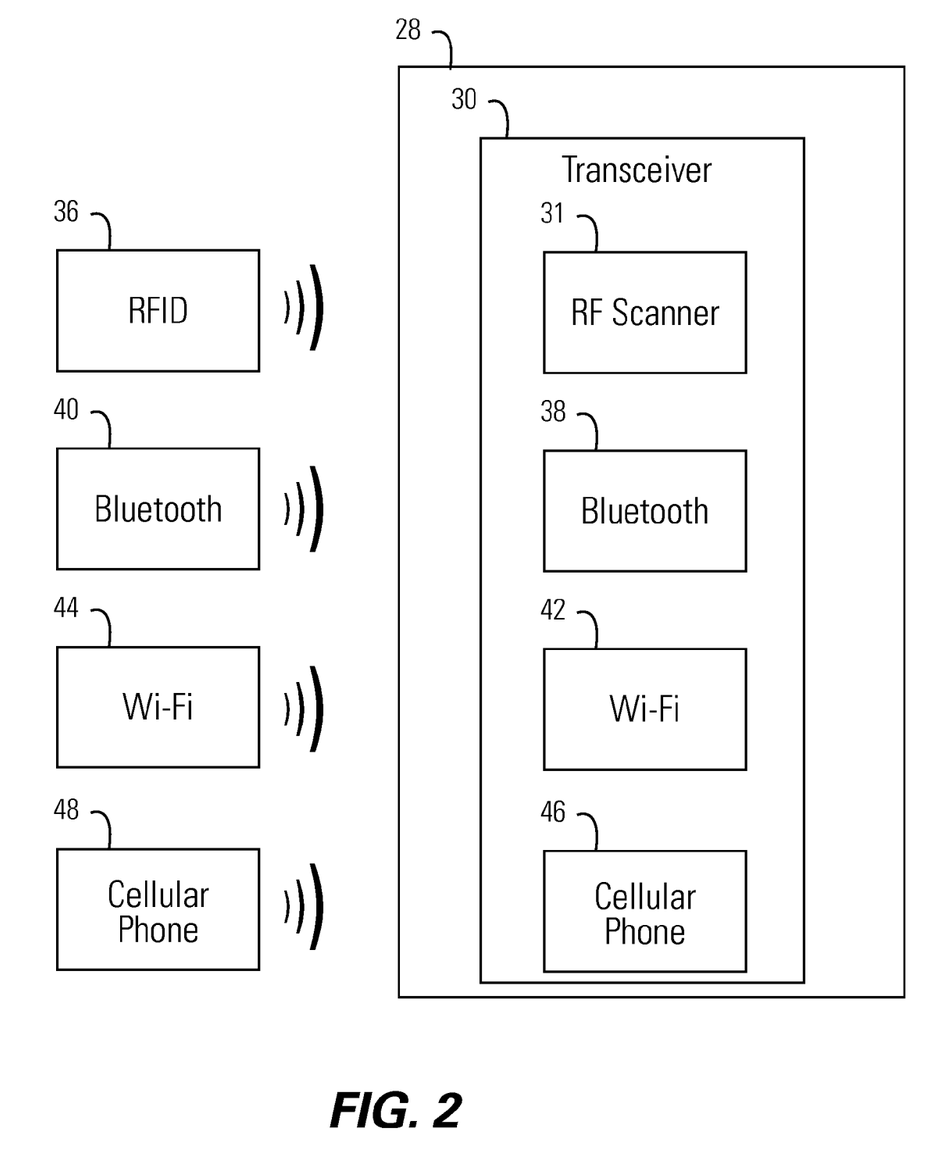
FIG. 2 shows a diagram of a communication unit and in-vehicle objects used with the in-vehicle GPS-based navigation system shown in FIG. 1 in accordance with an embodiment of the invention.

FIG. 2 shows a block diagram of the communication unit 28 as well as some of the in-vehicle objects from which information is received. Transceiver 30 may include a variety of technologies for scanning and gathering information from a variety of objects. For example, transceiver may be capable of receiving information from RFID tags, Bluetooth devices, Wi-Fi devices, cellular telephones, etc. To this end, transceiver 30 may include RFID circuitry 34 for transmitting and receiving information from object containing radio frequency identification (RFID) tags 36. Transceiver 30 may also include Bluetooth circuitry 38 for transmitting and receiving information from Bluetooth-equipped devices 40, and Wi-Fi circuitry 42 for transmitting and receiving information from Wi-Fi equipped devices 44. Transceiver 30 may also include circuitry 46 for transmitting and receiving information from objects equipped with cellular telephone technology 48.

Figure 3:
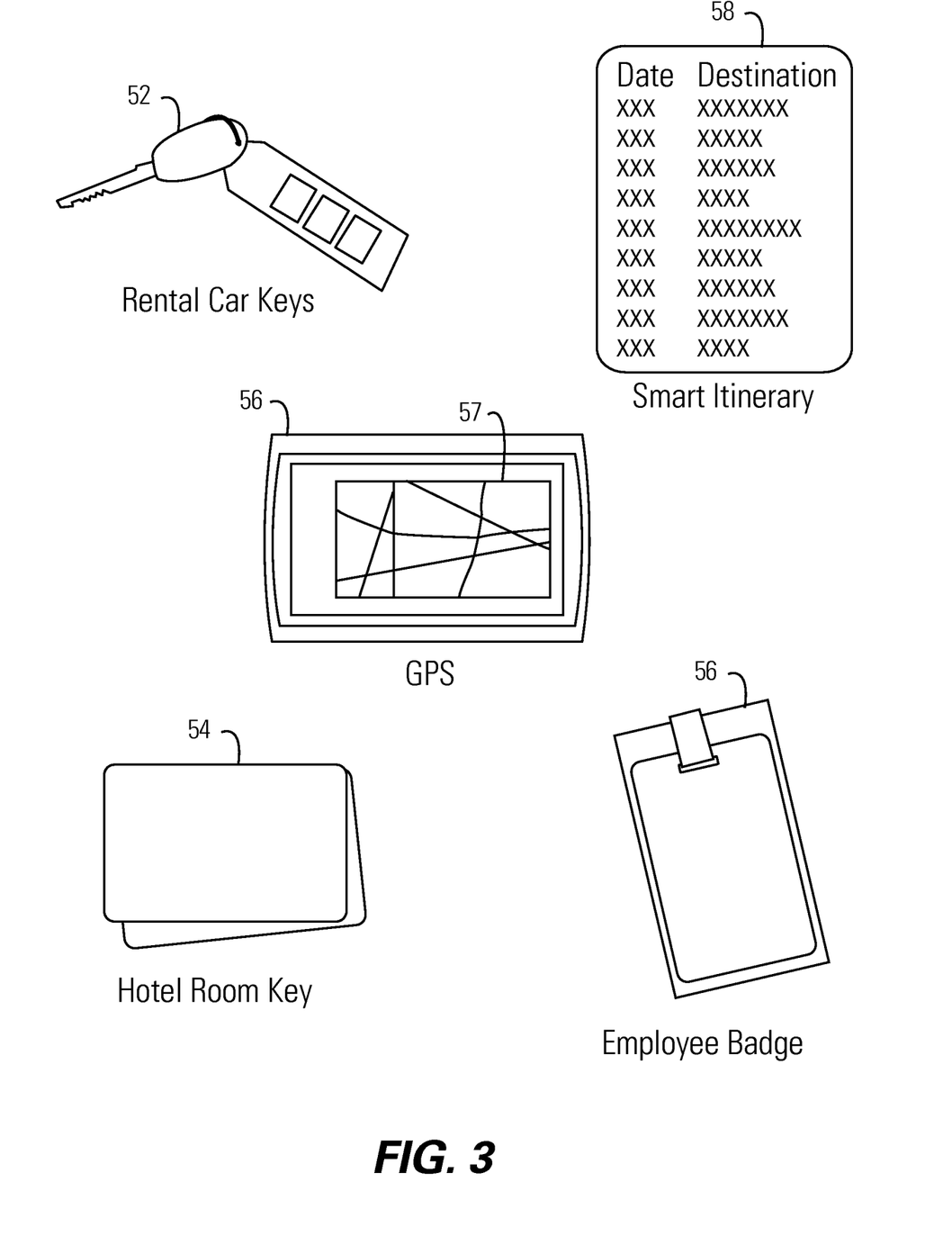
FIG. 3 shows additional in-vehicle objects detected by an in-vehicle GPS-based navigation system in accordance with an embodiment of the invention.

FIG. 3 shows a diagram of an embodiment of the GPS-based navigation system 50 and examples of various in-vehicle objects that it gathers data from. The navigation system 50 nay comprise, for example the navigation system 12 shown in FIGS. 1 and 2. Also shown in FIG. 3 is a display unit 51 showing a map of a route to a destination. The objects in the vehicle may include a rental car key 52, a hotel room key 54, an employee badge 56 and a smart itinerary 58. The rental car key 52, room key 54 and employee badge 56 may each be equipped with RFID tags, for example. The smart itinerary 58 may comprise, for example, a hand-held device, such as a PDA or Blackberry with the user's daily activities stored thereon. The smart itinerary may conventional known techniques to communicate with the GPS unit.

Figure 4:
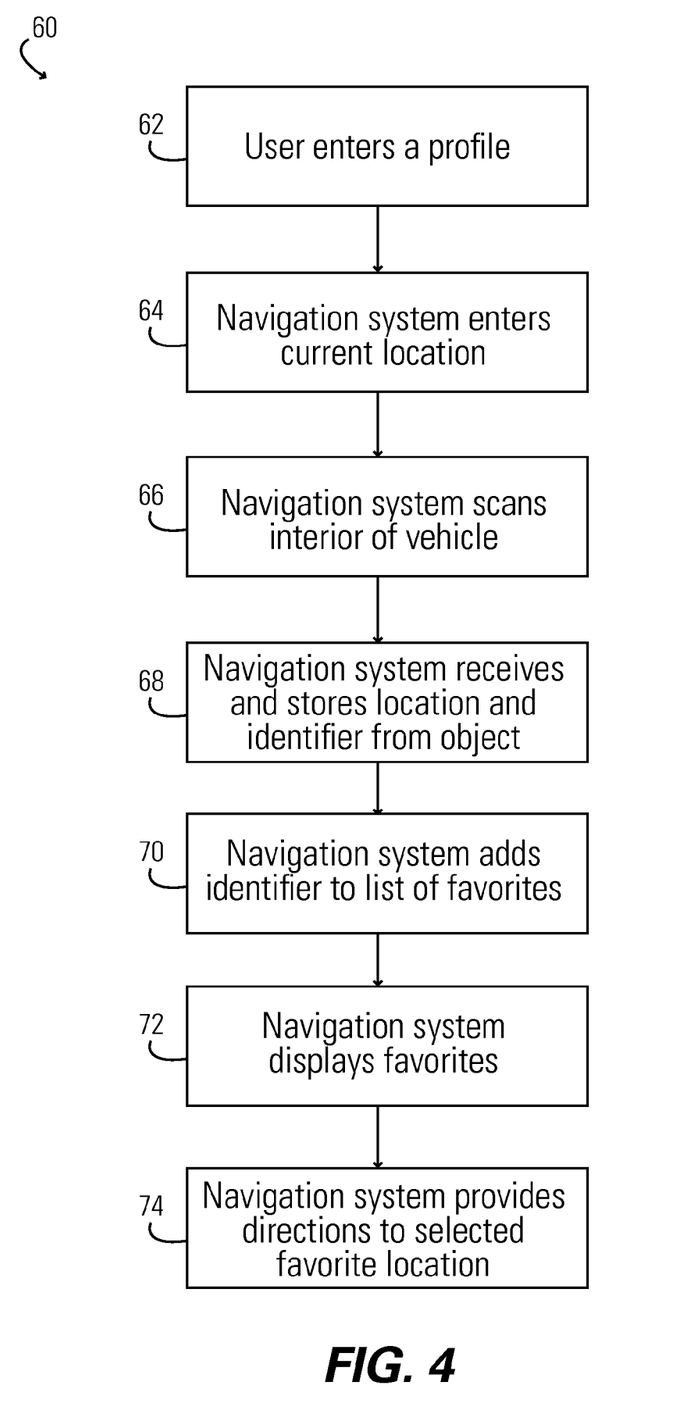
FIG. 4 shows a flow chart of a method of entering favorites into an in-vehicle GPS-based navigation system in accordance with an embodiment of the invention.

FIG. 4 shows a flow chart of a method 60 of transmitting favorite information from in-vehicle objects to a GPS-based navigation system. Method 60 represents an exemplary embodiment of a method used in the situation where a business traveler has reached a destination and the present invention automatically enters potential favorite destinations. In step 62, a user arrives at a destination, rents a car and enters a profile. This profile may, for example indicate that the user is on a business trip.

The navigation system may then automatically enter the current vehicle location as a favorite, in step 64. In this case, where the location is a rental car office, the user may select this stored favorite location to get directions back to the rental car office when returning the vehicle. In step 66, the navigation system scans the interior of the vehicle to detect the presence of objects from which it can receive information. For example, this may be accomplished by navigation system 12 shown in FIG. 1 using transceiver 30 to receive information from objects, such as objects 46-48 shown in FIG. 2.

The navigation system may then receive and store metadata information from the objects, in step 68. This information may include information regarding a location associated with the object and an identifier associated with the object and location. For example, where in object is a hotel key, the received information may include information regarding the location of the hotel that can be used by the Navigation system to provide directions to the hotel. The identifier may be the name of the hotel. In some instances, this information may include the GPS coordinates of the location, while in other instances, the information may simply consist of the address of the hotel and the navigation system may use its own internal processor and memory to access the GPS coordinates.

In step 70 the navigation system may store the received information including the identifier in a list of favorite destinations. Upon request of a user, of the navigation system, the navigation system may display the list of favorite destinations, in step 72. If the user selects a particular favorite destination, the navigation system may then provide directions to the selected favorite destination, in step 74. In this way, the user avoids the necessity of having to manually enter the favorite information.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electro-magnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wire line, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 5:
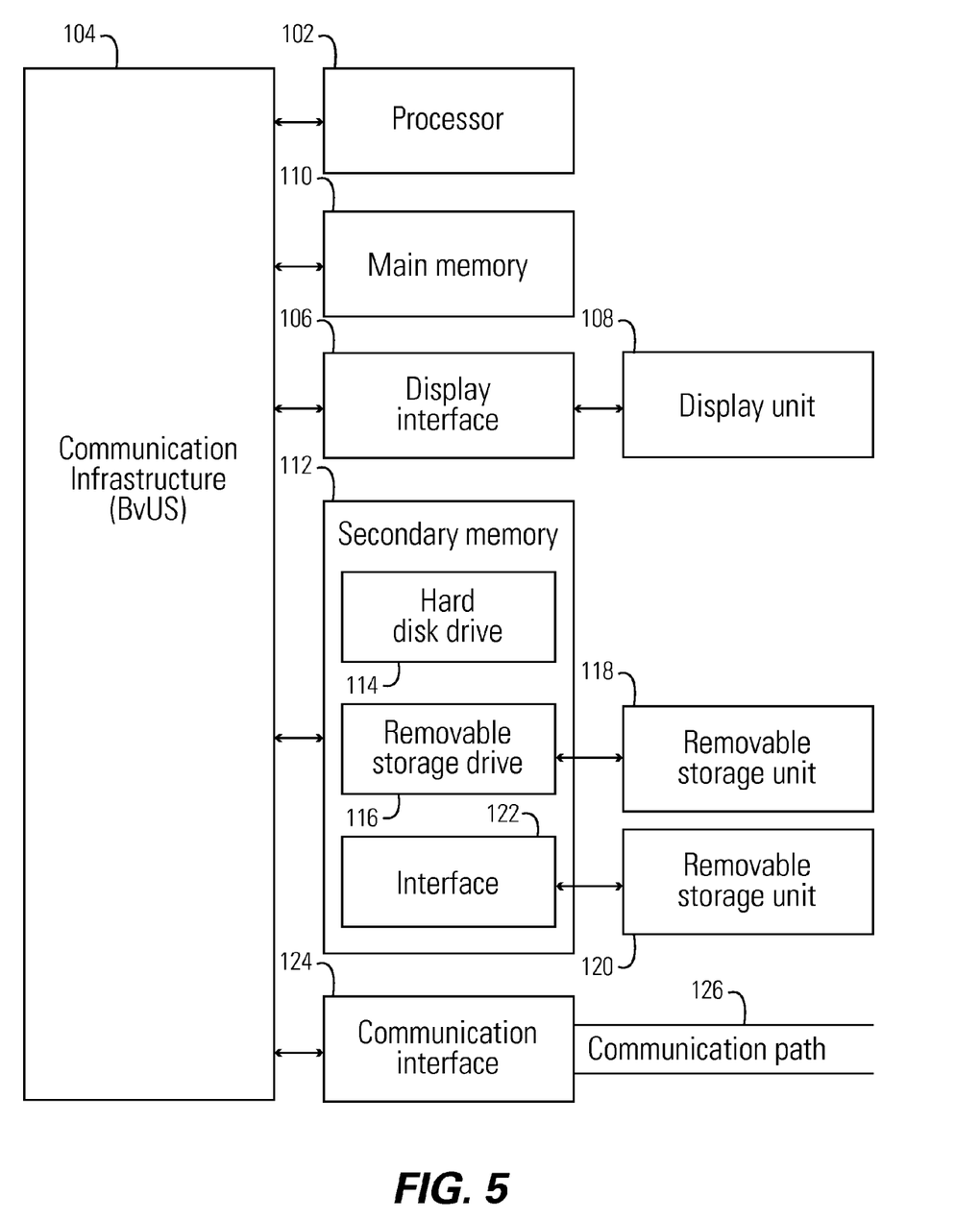
FIG. 5 shows a high level block diagram of an information processing system useful for implementing one embodiment of the present invention.

FIG. 5 is a high level block diagram showing an information processing system useful for implementing one embodiment of the present invention. The computer system includes one or more processors, such as processor 102. The processor 102 is connected to a communication infrastructure 104 (e.g., a communications bus, cross-over bar, or network). Various software embodiments are described in terms of this exemplary computer system. After reading this description, it will become apparent to a person of ordinary skill in the relevant art(s) how to implement the invention using other computer systems and/or computer architectures.

The computer system can include a display interface 106 that forwards graphics, text, and other data from the communication infrastructure 104 (or from a frame buffer not shown) for display on a display unit 108. The computer system also includes a main memory 110, preferably random access memory (RAM), and may also include a secondary memory 112. The secondary memory 112 may include, for example, a hard disk drive 114 and/or a removable storage drive 116, representing, for example, a floppy disk drive, a magnetic tape drive, or an optical disk drive. The removable storage drive 116 reads from and/or writes to a removable storage unit 118 in a manner well known to those having ordinary skill in the art. Removable storage unit 118 represents, for example, a floppy disk, a compact disc, a magnetic tape, or an optical disk, etc. which is read by and written to by removable storage drive 116. As will be appreciated, the removable storage unit 118 includes a computer readable medium having stored therein computer software and/or data.

In alternative embodiments, the secondary memory 112 may include other similar means for allowing computer programs or other instructions to be loaded into the computer system. Such means may include, for example, a removable storage unit 120 and an interface 122. Examples of such means may include a program cartridge and cartridge interface (such as that found in video game devices), a removable memory chip (such as an EPROM, or PROM) and associated socket, and other removable storage units 120 and interfaces 122 which allow software and data to be transferred from the removable storage unit 120 to the computer system.

The computer system may also include a communications interface 124. Communications interface 124 allows software and data to be transferred between the computer system and external devices. Examples of communications interface 124 may include a modem, a network interface (such as an Ethernet card), a communications port, or a PCMCIA slot and card, etc. Software and data transferred via communications interface 124 are in the form of signals which may be, for example, electronic, electromagnetic, optical, or other signals capable of being received by communications interface 124. These signals are provided to communications interface 124 via a communications path (i.e., channel) 126. This communications path 126 carries signals and may be implemented using wire or cable, fiber optics, a phone line, a cellular phone link, an RF link, and/or other communications channels.

In this document, the terms "computer program medium," "computer usable medium," and "computer readable medium" are used to generally refer to media such as main memory 110 and secondary memory 112, removable storage drive 116, and a hard disk installed in hard disk drive 114.

Computer programs (also called computer control logic) are stored in main memory 110 and/or secondary memory 112. Computer programs may also be received via communications interface 124. Such computer programs, when executed, enable the computer system to perform the features of the present invention as discussed herein. In particular, the computer programs, when executed, enable the processor 102 to perform the features of the computer system. Accordingly, such computer programs represent controllers of the computer system.

From the above description, it can be seen that the present invention provides a system, computer program product, and method for implementing the embodiments of the invention. References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
    under control of a Global Positioning Systems (GPS)-based navigation system inside a vehicle, performing:
        scanning to identify objects that can communicate electronically to said GPS-based navigation system and that each have an associated location and an identifier for that location;
        receiving information regarding said location and said identifier associated with said location from each of said objects;
        storing said information and said identifier in said GPS-based navigation system; and
        retrieving said information from said GPS-based navigation system using said identifier to enable selection of said location for obtaining directions to said selected location.

2. A method according to claim 1 wherein said receiving comprises receiving said information wirelessly from said objects.

3. A method according to claim 2 wherein said receiving comprises transmitting a signal to said objects and receiving said information in response to said transmitting.

4. A method according to claim 2 wherein said receiving comprises receiving a signal from an RFID tag.

5. A method according to claim 2 wherein said receiving comprises receiving a signal from a Bluetooth device.

6. A method according to claim 2 said receiving comprises receiving a signal from a cellular telephone.

7. A method according to claim 2 wherein said receiving comprises receiving a signal from a Wi-Fi device.

8. A method according to claim 1 wherein said identifier is a point of interest.

9. A method according to claim 1 wherein one of said objects is an employee badge.

10. A method according to claim 1 wherein one of said objects is a car key.

11. A computer program product comprising:
    a tangible computer usable medium having computer usable program code embodied therewith, said computer usable program code, when executed by a processor of a Global Positioning Systems (GPS)-based navigation system inside a vehicle, is
    configured to:
        scan to identify objects that can communicate electronically to said GPS-based navigation system and that each have an associated location and an identifier for that location;
        receive information regarding said location and said identifier associated with said location from each of said objects;
        store said information and said identifier in said GPS-based navigation system; and
        retrieve said information from said GPS-based navigation system using said identifier to enable selection of said location for obtaining directions to said selected location.

12. A computer program product according to claim 11 wherein said computer usable program code, when executed by said processor of said GPS-based navigation system inside said vehicle, is configured to:
    receive said information wirelessly from said object.

13. A computer program product according to claim 12 wherein said computer usable program code, when executed by said processor of said GPS-based navigation system inside said vehicle, is configured to:
    receive a signal from an RFID tag.

14. A computer program product according to claim 12 wherein said computer usable program code, when executed by said processor of said GPS-based navigation system inside said vehicle, is configured to:
    transmit a signal to said objects; and
    receive said information in response to said transmitting.

15. A computer program product according to claim 12 wherein said computer usable program code, when executed by said processor of said GPS-based navigation system inside said vehicle, is configured to:
    receive a signal from a Bluetooth device.

16. A computer program product according to claim 12 wherein said computer usable program code, when executed by said processor of said GPS-based navigation system inside said vehicle, is configured to:
receive a signal from a cellular telephone.

17. A computer program product according to claim 12 wherein said computer usable program code, when executed by said processor of said GPS-based navigation system inside said vehicle, is configured to:
receive a signal from a Wi-Fi device.

18. A computer program product according to claim 11 wherein said computer usable program code, when executed by said processor of said GPS-based navigation system inside said vehicle, is configured to:
receive a signal from a hotel room key.

19. A Global Positioning Systems (GPS)-based navigation system inside a vehicle, comprising:
a processor; and
storage coupled to the processor, wherein the storage stores computer program instructions, and wherein the processor executes the computer program instructions to perform operations, wherein the operations comprise:
scanning to identify objects that can communicate electronically to said GPS-based navigation system and that each have an associated location and an identifier for that location;
receiving information regarding said location and said identifier associated with said location from each of said objects;
storing said information and said identifier in said GPS-based navigation system; and
retrieving said information from said GPS-based navigation system using said identifier to enable selection of said location for obtaining directions to said selected location.

20. A GPS-based navigation system inside said vehicle according to claim 19 wherein said operations further comprise receiving said information wirelessly from said objects.

21. A GPS-based navigation system inside said vehicle according to claim 20 wherein said operations further comprise:
transmitting a signal to said objects; and
receiving said information in response to said transmitting.

22. A GPS-based navigation system inside said vehicle according to claim 20 wherein said operations further comprise:
receiving a signal from an RFID tag.

23. A GPS-based navigation system inside said vehicle according to claim 20 wherein said operations further comprise:
receiving a signal from a Bluetooth device.

24. A GPS-based navigation system inside said vehicle according to claim 20 wherein said operations further comprise:
receiving a signal from a cellular telephone.

25. A GPS-based navigation system inside said vehicle according to claim 20 wherein said operations further comprise:
receiving a signal from a Wi-Fi device.

* * * * *